United States Patent [19]

Spicher

[11] Patent Number: 4,621,859
[45] Date of Patent: Nov. 11, 1986

[54] WEATHERSHIELD FOR GOLF CART AND A METHOD OF ENCLOSING A GOLF CART

[76] Inventor: Kenneth N. Spicher, 325 Fairway, Wichita, Kans. 67212

[21] Appl. No.: 658,675

[22] Filed: Oct. 9, 1984

[51] Int. Cl.⁴ .............................................. B60J 9/00
[52] U.S. Cl. ................................................. 296/78 R
[58] Field of Search .......................... 296/78 R, 102; 280/DIG. 5; 135/88

[56] References Cited

U.S. PATENT DOCUMENTS

| | | | |
|---|---|---|---|
| 2,423,748 | 7/1947 | Acheson | 296/78 R |
| 2,460,399 | 2/1949 | Schassberger | 296/78 R |
| 2,682,427 | 6/1954 | Bright | 296/78 R |
| 3,709,553 | 1/1973 | Churchill | 296/78 R |
| 4,013,315 | 3/1977 | West | 296/83 |
| 4,098,536 | 7/1978 | Mills | 296/78 R |

*Primary Examiner*—Robert R. Song
*Attorney, Agent, or Firm*—John W. Carpenter; John H. Widdowson

[57] ABSTRACT

A weathershield for use on golf carts, or the like, of the type having a passenger compartment. The weathershield includes in combination a pipe frame mounted on the golf cart. The pipe frame has a roof defined by a front pipe, a back pipe, and a pair of side pipes secured to the front pipe and to the back pipe. The weathershield additionally includes a first sheet of flexible, water repellent material in a configuration which includes a top wall having outer dimensions at least equal to the outer dimensions of the roof of the pipe frame, and a front and a rear wall depending downwardly from the outer edges of the top wall portion and being of sufficient length to respectively detachably fasten to the front and to the rear of the golf cart for enclosing the same. The front wall includes a first transparent portion for visibility in guiding the golf cart. A pair of doors are easily removably secured to the pair of front upright support pipes by hinges having easily removable pins. The method of enclosing a golf cart includes mounting on the golf cart the pipe frame, positioning over the pipe frame the first sheet of flexible, water repellent material, and securing hingedly the pair of doors to a pair of front upright support pipes.

2 Claims, 9 Drawing Figures

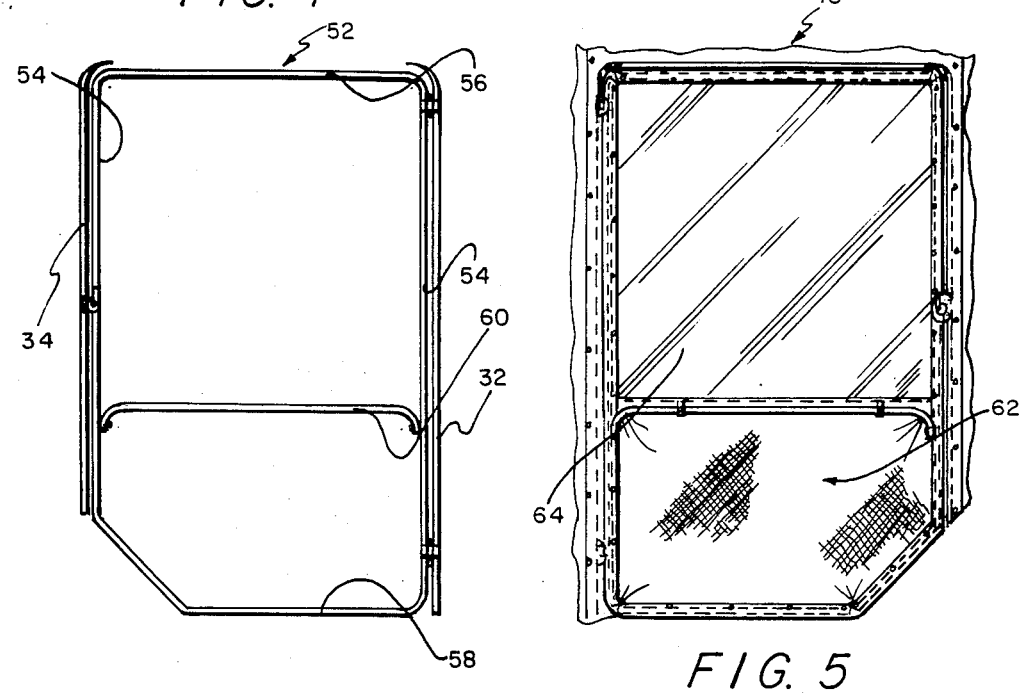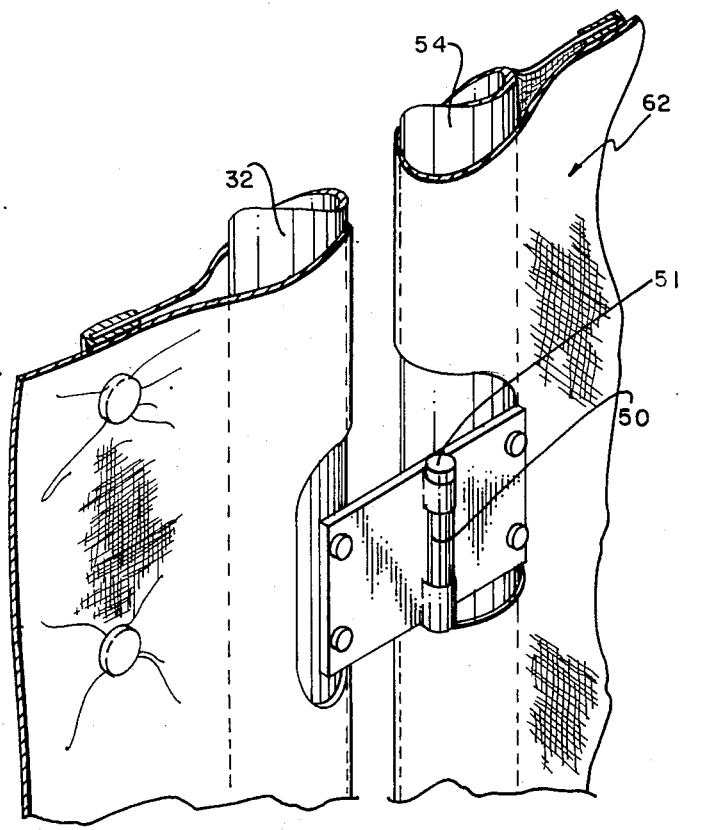

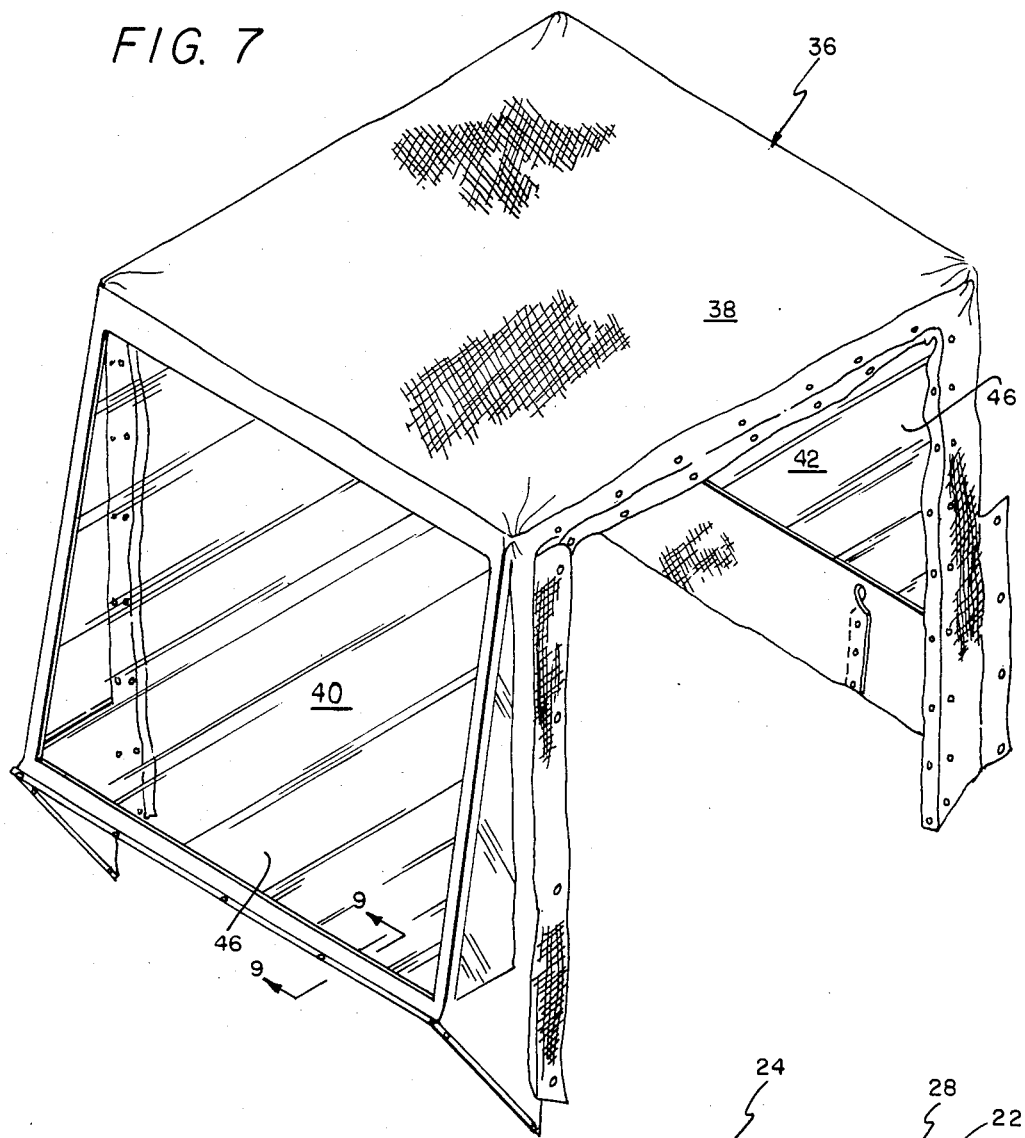
FIG. 7
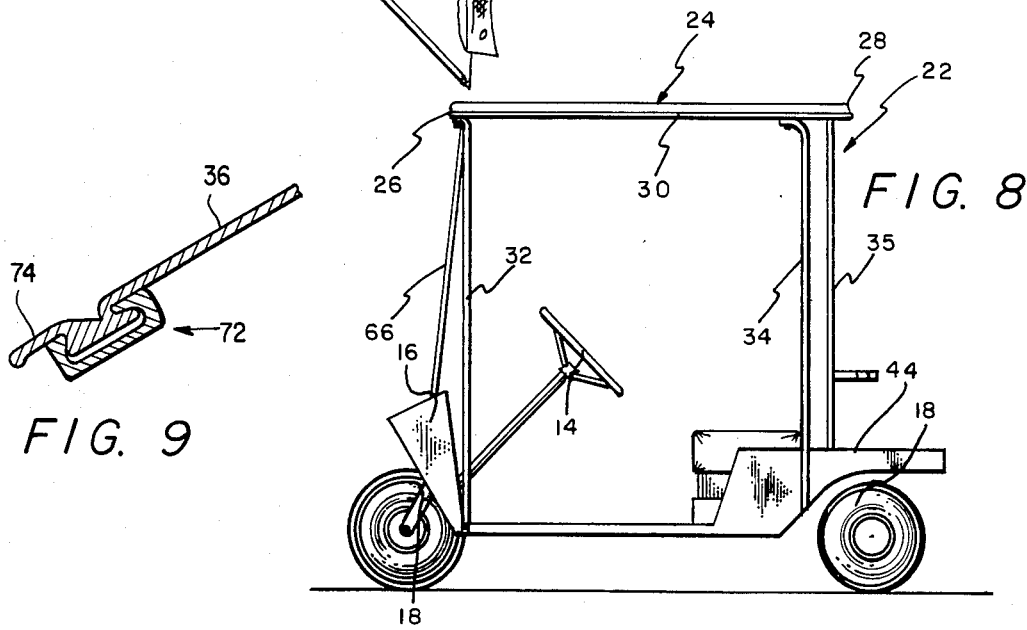
FIG. 9
FIG. 8

WEATHERSHIELD FOR GOLF CART AND A METHOD OF ENCLOSING A GOLF CART

BACKGROUND OF THE INVENTION

1. Field of the Invention

This invention provides an improved weathershield for a golf cart. More specifically, this invention contemplates a novel weathershield for a golf cart, and a method for enclosing a golf cart.

2. Description of the Prior Art

U.S. Pat. No. 4,332,415 by Williams discloses roll down protectors which may be attached to the roof of golf carts. U.S. Pat. No. 4,098,536 by Mills teaches a weathershields for golf carts that fits over the same and includes a front windshield as well zippered side openings so that access to and out of the cart may be readily accomplished. U.S. Pat. No. 4,013,315 by West illustrates a golf cart rain curtain or cover. U.S. Pat. No. 4,336,964 by Pivar teaches a three-wheeled vehicle having an enclosure over the same. None of the foregoing prior art teach or suggest the particular weathershield and/or the method of enclosing a golf cart, of this invention.

SUMMARY OF THE INVENTION

This invention accomplishes its desired objects by providing a novel weathershield means for use on golf carts, or the like, of the type having a passenger compartment. The weathershield comprises in combination a pipe frame means mounted on the golf cart. The pipe frame means has a roof defined by a front pipe, a back pipe, and a pair of side pipes secured to the front pipe and to the back pipe. The pipe frame means additionally includes a pair of front upright support pipe members mounted on a golf cart and secured to the roof in close proximity to the juncture of the front pipe with a pair of side pipes, and a pair of rear upright support pipe members mounted on the golf cart and secured to the roof in close proximity to the juncture of the back pipe with the pair of side pipes. The weathershield means additionally comprises a first sheet of flexible, water repellent material means in a configuration including a top wall having outer dimensions at least equal to the outer dimensions of the roof of the pipe frame means, and a front and a rear wall depending downwardly from the outer edges of the top wall portion and being of sufficient length to respectively detachably fasten to the front and to the rear of the golf cart for enclosing the same. A first transparent portion is included in at least the front wall for visibility in guiding the golf cart. The weathershield means yet further comprises a pair of door means hingedly secured preferably by easily removable hinge pins to the pair of front upright support pipe means. Each of the door means comprises a door pipe frame means defined by a pair of vertical pipe means, a top and a bottom horizontal pipe means integrally bound to the pair of vertical pipe means, and a cross brace pipe means connected to the pair of vertical pipe means. Each of the door means further comprises a second sheet of flexible, water repellent material means depending from and detachably secured to the outer edges to the door pipe frame means. A second transparent portion is included within the second sheet of the material means for each of the two door means for visibility. This invention also accomplishes its desired objects by further providing a method of enclosing a golf cart of the type having a passenger compartment which comprises the steps of mounting on the golf cart the pipe frame means, positioning over the pipe frame means the first sheet of flexible, water repellent material means, and securing hingedly the pair of door means to the pair of front upright support pipe means.

It is an object of the invention to provide a novel weathershield means for a golf cart.

Still further objects of the invention reside in the provisions of a method for enclosing a golf cart and a weathershield for a golf cart which can be easily transported, provide easy accessibility to the interior, and is relatively inexpensive to manufacture.

These together with the various ancillary objects and features will become apparent as the following description proceeds, are attained by this invention, preferred embodiments being shown in the accompanying drawings, by way of example only, wherein:

BRIEF DESCRIPTION OF THE DRAWINGS

FIG. 4 is a front elevational view of a pipe frame of the door for weathershield;

FIG. 5 is a front elevational view of a door of the weathershield including the flexible, water repellent material positioned over the frame thereof;

FIG. 6 is a partial perspective exploded view of hinged mechanism which connects the door with a frame mounted on top of the golf cart;

FIG. 7 is an exploded perspective view of the flexible, water repellent material which is positioned over the frame that is mounted on the golf cart;

FIG. 8 is a side elevational view of the golf cart with the frame mounted on top thereof; and FIG. 9 is a vertical sectional view taken in direction of the arrows and along the plane of line 9—9 in FIG. 7.

DETAILED DESCRIPTION OF THE INVENTION

Figure 1:
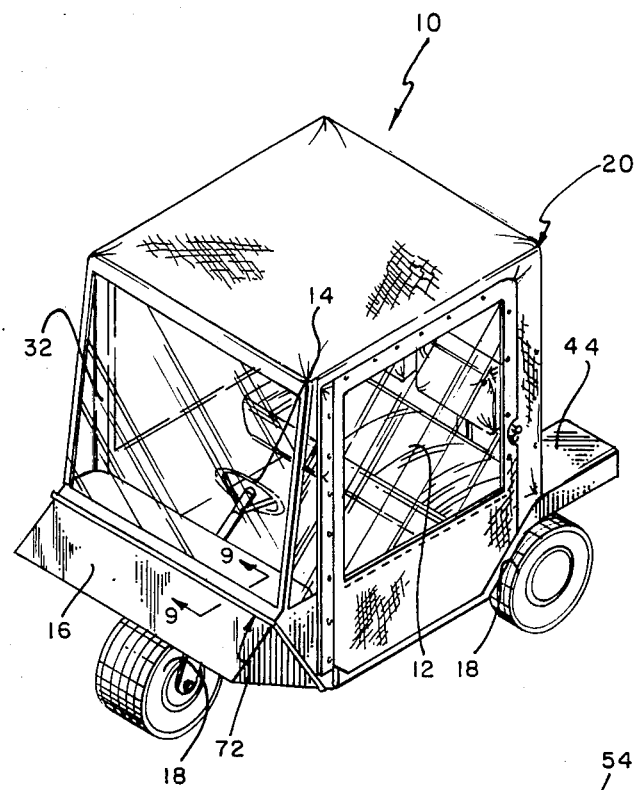
FIG. 1 is a perspective view of a golf cart having the novel weathershield for enclosing the passenger compartment of the same.
Figure 2:
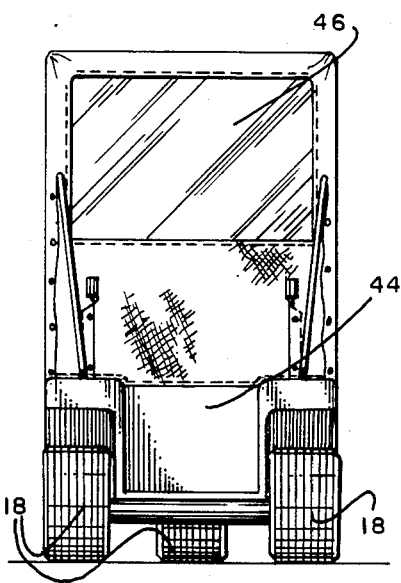
FIG. 2 is a rear elevation view of the golf cart of FIG. 1.

Referring in detail now to the drawings, wherein like reference numerals designates similar parts throughout the various views, there is seen an enclosed golf cart, generally illustrated as 10. The enclosed golf cart 10 comprises a seat 12 for passengers, a steering wheel 14, a front 16, and a plurality of wheels 18 which rotatably support the enclosed golf cart 10. The golf cart 10 additionally comprises a weathershield, generally illustrated as 20, which includes in combination a pipe frame (see FIG. 8), generally illustrated as 22, mounted on the golf cart 10 and including a roof, generally illustrated as 24, and defined by a front pipe 26, supported by front pipes 66—66, a back pipe 28, supported by rear pipes 35—35, and a pair of side pipes 30 secured to the front pipe 26 and to the back pipe 28. The weathershield 20 additionally comprises a pair of front upright support pipe members 32—32 mounted on the golf cart 10 and secured to the roof 24 in close proximity to the juncture of the front pipe 26 with the pair of side pipes 30—30. The weathershield 20 additionally comprises a pair of rear upright support pipe members 34—34 mounted on the golf cart 10 and secured to the roof 24 in close proximity to the juncture of the back pipe 28 with the pair of side pipes 30—30.

The weathershield 20 yet further comprises a sheet of flexible, water repellent material (see FIG. 7) generally illustrated as 36 and including a configuration having a top wall 38 with an outer dimension at least equal to the outer dimensions of the roof 24 of the pipe frame 22, and a front 40 and a rear wall 42 depending downwardly from the outer edges of the top wall 38 and being of sufficient length to respectively detachably fasten to the front 16 and rear 44 of the golf cart 10 for enclosing the same. A transparent portion 46 is included within the front wall 40 and the rear wall 42 for visibility in guiding the golf cart 10. A pair of doors, generally illustrated as 48, is secured via a hinge 50 having an easily removable pin 51 (see FIG. 6) to the pair of front upright support pipes 32—32. Each of the doors 48 comprises a door pipe frame, generally illustrated as 52 in FIG. 4, defined by a pair of vertical pipes 54—54, a top 56 and a bottom 58 horizontal integrally bound to the pair of vertical pipes 54—54. The door pipe frame 52 additionally comprises a cross brace pipe 60 connected to the pair of vertical pipes 54—54.

Each of the door means 48 further comprises another sheet of flexible, water repellent material, generally illustrated as 62, depending from and detachably secured to the outer edges of the door pipe frame 52. A second transparent portion 64 (see FIG. 5) is included within the second sheet of material 62 for each of the two door means 48 for visibility. Each of the second transparent portions 64 extend from the top horizontal pipe 56 down to the cross brace pipe 60.

The weathershield 20 additionally comprises a pair of windshield pipe 66—66 (see FIG. 8) which is secured to and depend downwardly from the front pipe 26 of the roof 24 and is connected to and supported by the front 16 of the golf cart 10. The outer dimension of the transparent portion 46 is the perimeter generally defined by the length of the front pipe 26 of the roof 24, the length of the pair of the windshield pipes 66—66, and the distance separating the pair of windshield pipes 66—66 at their point of attachment to the front 16 of the golf cart 10.

Figure 3:
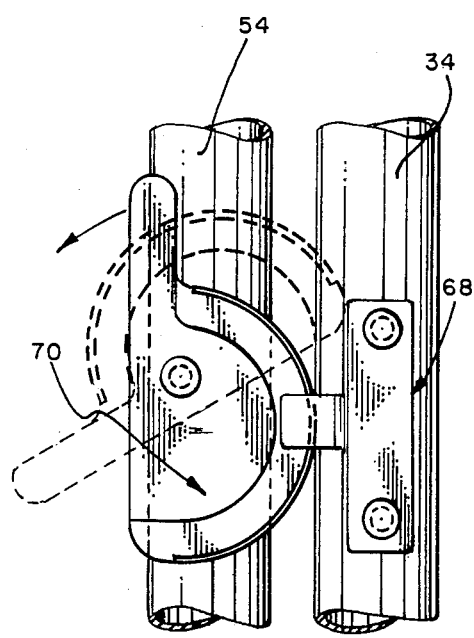
FIG. 3 is a partial exploded front elevational view for latch mechanism for the doors of the weathershield.

Each of the two rear upright support pipe members 34—34 include a hook means, generally illustrated as 68 in FIG. 3; and each of the door means 48 additionally include a latch means, generally illustrated as 70 in FIG. 3, which is secured to one of the vertical pipes 54 of the door pipe frame for removably securing the pair of door means 48 to the pair of rear upright support pipe members 34—34. A fastener, generally illustrated as 72 in FIG. 9, is provided within the weathershield 20. The fastener traverses the entire front 16 (see FIG. 1) of the golf cart 10 in order to fasten the sheet of flexible, water repellent material 36 to the front 16 of the golf cart 10. The fastener 72 is generally elliptical in vertical cross section with an opening 74 to receive the flexible, water repellent material 36.

With continuing reference to the drawing for operation of the invention and the method of enclosing a golf cart 10 of the type having a passenger compartment, the pipe frame means 22 is mounted on the golf cart. In a preferred embodiment of the invention, the pair of windshield pipes 66—66 is secured and depended downwardly from the front pipe 26 of the roof 24 and connected to the front 16 of the golf cart 10. The sheet of flexible, water repellent material 36 is positioned over the pipe frame means 22. Simultaneously with this positioning, the front 40 of the sheet of flexible, water repellent material 36 is also positioned over the pair of windshield pipes 66—66. As was previously mentioned, the sheet of flexible, water repellent material 36 includes a top 38 that has an outer dimension of at least equal to the outer dimension of the roof 24 of the pipe frame means 22. As was also previously mentioned, the front 40 and the rear 22 wall of the sheet 36 depend downwardly from the outer edges of the top wall 38 and are sufficient length to respectively detachably fasten to the front 16 and the rear 44 of the golf cart 10 for enclosing the same. The fastening means 72 generally traverses the entire front 16 of the golf cart 10 in order to provide a means for enabling to fasten the front wall 40 to the front 16 of the golf cart 10. The pair of door means 48 is subsequently secured hingedly via hinge 50 having easily removable pin 51 to the pair of front upright support pipes 32—32. Each of the door means 48 further comprises a sheet of flexible, water repellent material 62 which depend from and detachably secured to the outer edges of the door pipe frame 52. In a preferred embodiment of the invention, the sheet of flexible, water repellent material 62 includes a transparent portion 64 to assist the driver of the golf cart 10 in seeing where he or she is going. Also in a preferred embodiment of the invention in order to assist the user of the golf cart 10 in visibility, the transparent portion 46 is included within the front wall 40 and the rear wall 42 of the sheet of flexible, water repellent material 36.

Each of the door means 48 is kept in a closed position as illustrated in FIG. 1, through the use of the generally C-shaped latching mechanism 70 which is mounted on one of the vertical pipes 54. The latching mechanism 70 pivotally swings from the open dotted line position (see FIG. 3) for opening and closing of the door means 48 to the closed solid line position which engages the hook mechanism 68 in order to secure each of the door means 48 to the pair of rear upright support pipe members 34—34.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A weathershield means for use on golf carts, or the like, of the type having a passenger compartment comprising in combination a pipe frame means mounted on said golf cart, said pipe frame means having a roof defined by a front pipe, a back pipe, a pair of side pipes secured to the front pipe and the back pipe, a pair of front upright support pipe members mounted on the golf cart and secured to said roof in close proximity to the juncture of the front pipe with the pair of side pipes, and a pair of rear upright support pipe members mounted on the golf cart and secured to the roof in close proximity to the juncture of the back pipe with the pair of side pipes; a first sheet of flexible, water repellent material means in a configuration including a top wall having outer dimensions at least equal to the outer dimensions of said roof of the pipe frame means, a front and a rear wall depending downwardly from the outer edges of the top wall portion and being of sufficient length to respectively detachably fasten to the front and rear of the golf cart for enclosing the same, and a first transparent portion in at least the front wall for visibility in guiding the golf cart; a pair of door means hingedly and easily removably secured to said pair of front upright support pipe means by hinges having an easily retractable pin, each of said door means comprising a door pipe frame means defined by a pair of vertical pipe means, a top and a bottom horizontal pipe means integrally bound to said pair of vertical pipe means, and a cross brace pipe means connected to said pair of vertical pipe means, each of said door means further comprises a second sheet of flexible, water repellent material means depending from and detachably secured to the outer edges of said door pipe frame means, and a second transparent portion included within the second sheet of material means for each of said two door means for visibility; each of said second transparent portion extends from the top horizontal pipe means to the cross brace pipe means;

a pair of windshield pipe means secured to and depending downwardly from the front pipe of said roof and connected to and supported by the front of the golf cart;

the outer dimensions of said first transparent portion is the perimeter generally defined by the length of said front pipe of said roof, the length of said pair of said pipe windshield means, and the distance separating said pair of pipe windshield means at their point of attachment to the front of the golf cart;

each of said two rear upright support pipe members includes a hook means and each of said door means additionally comprises a latch means secured to one of the vertical pipe means of said door pipe frame means for removably securing the pair of door means to the pair of rear upright support pipe members; a lug means integrally bound to said first material means; and a fastener means traversing the entire front of the golf cart in order to fasten the first sheet of flexible, water repellent material means to the front of the golf cart, said fastener means comprising a vertical cross section being generally elliptical with an opening to receive the lug means of the first material means.

2. A method of enclosing a golf cart of the type having a passenger compartment comprising the steps of:

(a) mounting on said golf cart a pipe frame means having a roof defined by a front pipe, a back pipe, a pair of side pipes secured to the front pipe and the back pipe, a pair of front upright support pipe members connected to the golf cart and to the roof in close proximity to the juncture of the front pipe with the pair of side pipes, and a pair of rear upright support pipe members attached to the golf cart and to the roof in close proximity to the juncture of the back pipe with the pair of side pipes;

(b) securing and depending downwardly from the front pipe of said roof and connecting to the front of the golf cart a pair of windshield pipe means;

(c) positioning over said pipe frame means a first sheet of flexible, water repellent material means in a configuration including a top wall having outer dimensions at least equal to the outer dimensions of said roof of the pipe frame means, a front and a rear wall depending downwardly from the outer edges of the top wall portion and being of sufficient length to respectively detachably fasten to the front and rear of the golf cart for enclosing the same, said front wall including a first transparent portion for visibility in guiding the golf cart and a lug means integrally bound to the bottom thereof;

(d) positioning said front of said first sheet of flexible, water repellent material means over said pair of pipe windshield means simultaneously with said positioning said first material means over said pipe frame means;

(e) securing a fastener means to the entire front of said golf cart in order to fasten the first sheet of flexible, water repellent material means to the front of the golf cart, said fastener means comprising a vertical cross section being generally elliptical with an opening;

(f) lodging removably said lug means into said opening of step (e) to secure the front wall of the first material means to the front of the golf cart;

(g) securing hingedly and easily removable a pair of door means to said pair of front upright support pipe means, each of said door means comprising a door pipe frame means defined by a pair of vertical pipe means, a top and a bottom horizontal pipe means integrally bound to said pair of vertical pipe means, a cross brace pipe means connected to said pair of vertical pipe means, and a second sheet of flexible, water repellent material means depending from and detachably secured to the outer edges of the door pipe frame means, said second sheet of material means including a second transparent portion for each of said two door means for visibility.

* * * * *